3,326,750
PROCESS FOR CONTROLLING FUNGI WITH ANTHRAQUINONE DERIVATIVES

Hans Weidinger and Ernst-Heinrich Pommer, Limburgerhof, Pfalz, and Heinz Eilingsfeld, Ludwigshafen (Rhine), Germany, assignors to Badische Anilin- & Soda-Fabrik Aktiengesellschaft, Ludwigshafen (Rhine), Germany
No Drawing. Filed Oct. 25, 1966, Ser. No. 589,243
Claims priority, application Germany, Nov. 20, 1965, B 84,590
1 Claim. (Cl. 167—30)

The present invention relates to a process for controlling fungi with anthraquinone derivatives. In particular it relates to the control of injurious fungi in agriculture with the said compounds without damaging the plants.

We have found that compounds having the formula

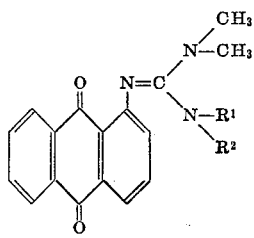

in which $R^1$ and $R^2$ denote lower alkyl radicals or $R^1$ and $R^2$ together with the nitrogen atom of which they are substituents denote a piperidine or morpholine radical, or the salts of the said compounds, have a good fungicidal action.

By salts we mean salts of compounds with inorganic or organic acids, for example hydrochloric acid, sulfuric acid, phosphoric acid, acetic acid, propionic acid, butyric acid, chloroacetic acid and trichloroacetic acid, or the quaternary salts formed by reacting the compounds with an alkylating agent, for example a methylating agent, such as dimethyl sulfate or methyl toluene sulfonate, e.g. butyl bromide or ethyl vinyl sulfonate.

The method of preparing the compounds is described in German printed application 1,125,908.

The agents according to this invention having a fungicidal and/or fungistatic action may be used in conventional manner by adding solid extenders to dusts or by adding dispersing, wetting and/or adhering agents to solid liquid formulations for the preparation of aqueous sprays. Solutions and emulsions of the active ingredients may also be applied as aerosols if the conventional solvents are used. Mixture with other fungicides and/or insecticides is possible. The compounds to be used according to this invention are effective particularly against common powdery mildew and also against other injurious fungi.

The following examples illustrate the action of the compounds according to this invention.

Example 1

Leaves of barley seedlings grown in pots are sprayed with aqueous emulsions of 80% of active ingredient and 20% of emulsifying agent and, after the spray coating has dried, the leaves are dusted with oidia (spores) of barley mildew (*Erysiphe graminis hordei*). The test plants are then put in a greenhouse at temperatures between 20° and 22° C. and 75 to 80% relative humidity. Ten days later the development of the mildew fungi is determined, and is shown in the table below.

TABLE

| Active ingredient | Intensity of attack on leaves after spraying with active ingredient liquor | | | |
|---|---|---|---|---|
| | 0.03% | 0.06% | 0.1% | 0.2% |
| [anthraquinone structure] | 0 | 0 | | |
| Salt of this compound with CH₃COOH | 2 | 1 | 1 | 0 |
| Salt of this compound with CHCl₂COOH | 1 | 1 | 0 | 0 |
| Salt of this compound with HCl | 0 | 0 | 0 | 0 |
| [quaternary salt structure with H₃CO—SO₃⁻] | 2 | 1 | 0 | 0 |

TABLE—Continued

| Active ingredient | Intensity of attack on leaves after spraying with active ingredient liquor | | | |
|---|---|---|---|---|
| | 0.03% | 0.06% | 0.1% | 0.2% |
| ![structure: anthraquinone with N=C(N(CH3)2)-N(H)-piperidine] | 0 | 0 | 0 | 0 |
| Salt of this compound with HCl | 0 | 0 | 0 | 0 |
| ![structure: anthraquinone with N=C(N(CH3)2)-morpholine] | 1 | 1 | 0 | 0 |
| Control (untreated) | | | 5 | |

0 = no attack.
Graded up to 5 = total attack.

Example 2

Leaves of cucumber seedlings grown in pots are sprayed with aqueous emulsions of 80% of active ingredient and 20% of emulsifying agent and, after the spray coating has dried, the leaves are dusted with oidia (spores) of cucumber mildew (*Erysiphe cichoriacearum*). The test plants are then placed in a greenhouse at temperatures between 20° and 22° C. and 75 to 80% relative humidity. The development of the mildew fungi is determined ten days later, and is shown in the table below.

TABLE

| Active ingredient | Intensity of attack on leaves after spraying with active ingredient liquor | | |
|---|---|---|---|
| | 0.006% | 0.012% | 0.025% |
| ![structure: anthraquinone with N=C(N(CH3)2)-N(CH3)2] | 0 | 0 | 0 |
| Salt of this compound with $CH_3COOH$ | 2 | 0 | 0 |
| Salt of this compound with $CHCl_2COOH$ | 0 | 0 | 0 |
| ![structure: anthraquinone with N=C(N(CH3)2)-N+(CH3)2 · $H_3CO-SO_3^{\ominus}$] | 1 | 0 | 0 |

TABLE—Continued

| Active ingredient | Intensity of attack on leaves after spraying with active, ingredient liquor | | |
|---|---|---|---|
| | 0.006% | 0.012% | 0.025% |
| 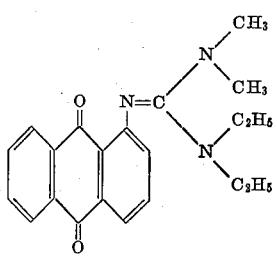 | 1 | 0 | 0 |
| 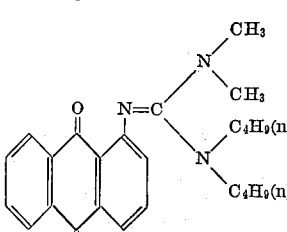 | 0 | 0 | 0 |
| 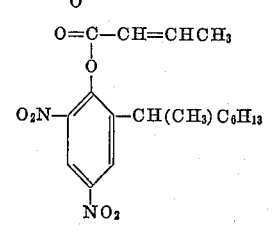 | 3 | 2 | 0 |
| Substance for comparison—control (untreated) | | 5 | |

0 = no attack.
Graded up to 5 = total attack.

We claim:

A method of controlling fungi wherein the objects to be protected from attack by fungi are treated with a fungitoxic amount of a compound having the formula

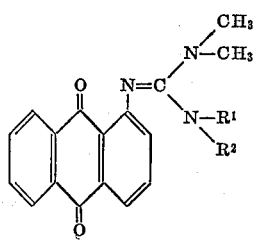

in which $R^1$ and $R^2$ denote lower alkyl radicals or $R^1$ and $R^2$ together with the nitrogen atom of which they are substituents denote a piperidine or morpholine radical, or the salts of the said compounds.

No references cited.

ALBERT T. MEYERS, *Primary Examiner.*

DAREN M. STEPHENS, *Assistant Examiner.*

UNITED STATES PATENT OFFICE
CERTIFICATE OF CORRECTION

Patent No. 3,326,750                              June 20, 1967

Hans Weidinger et al.

It is hereby certified that error appears in the above numbered patent requiring correction and that the said Letters Patent should read as corrected below.

Column 2, line 12, for "to solid liquid" read -- to solid or liquid --.

Signed and sealed this 18th day of June 1968.

(SEAL)
Attest:

Edward M. Fletcher, Jr.                            EDWARD J. BRENNER
Attesting Officer                                    Commissioner of Patents